United States Patent [19]

Yokota

[11] Patent Number: 4,799,302

[45] Date of Patent: Jan. 24, 1989

[54] METHOD OF MANUFACTURING HOLDING DEVICE OF ROLLER BEARING FOR RECTILINEAR MOTION

[75] Inventor: Yasunori Yokota, Kanagawa, Japan

[73] Assignee: Nippon Thompson Co., Ltd., Tokyo, Japan

[21] Appl. No.: 46,269

[22] Filed: May 5, 1987

Related U.S. Application Data

[62] Division of Ser. No. 863,691, May 15, 1986, Pat. No. 4,701,059.

[30] Foreign Application Priority Data

Sep. 18, 1985 [JP] Japan .......................... 60-204197

[51] Int. Cl.$^4$ ............................................. B21D 53/12
[52] U.S. Cl. ................................. 29/148.4 C; 425/577
[58] Field of Search ................... 29/148.4 C; 425/577; 384/576, 614, 580

[56] References Cited

U.S. PATENT DOCUMENTS

| 2,403,460 | 7/1946 | Rosner | 384/614 |
| 3,003,830 | 10/1961 | Blazels et al. | 384/534 X |
| 3,281,189 | 10/1966 | Olamman | 384/30 |
| 4,623,270 | 11/1986 | Olschewski et al. | 29/148.4 C |

FOREIGN PATENT DOCUMENTS 224518 10/1989 Australia ............................ 384/576

Primary Examiner—Timothy V. Eley
Attorney, Agent, or Firm—Trexler, Bushnell, Giangiorgi & Blackstone

[57] ABSTRACT

There is a holding device of a rolling bearing for rectilinear motion in which a plurality of rolling members such as balls or rollers are rectilinearly arranged at regular intervals in track grooves or track surfaces. This holding device has a rectangular plate-like shape made of a plastic material. Many windows are formed at regular intervals in the longitudinal direction of the holding device. Each window is formed so as to have the relation of $S<L<D<E$ (where, S and L are outside diameters on both sides of the window and E is an inside diameter thereof and D is a diameter of each ball). The outside diameter of the adjacent windows in the same side surface of the holding device differ. This holding device is manufactured by injecting and molding a plastic material into the rectangular molding die at high pressure and high temperature. In this case, many barrel-shaped window pins are disposed in the cavity of the die at regular intervals in its longitudinal direction. Thereafter, the window pins which are adjacent to one another are alternately pulled out one or two at a time in the opposite directions. With this method, an economical holding device having small slide friction and resistance can be easily manufactured. Also, the balls or rollers are difficult to drop out of the holding device.

3 Claims, 4 Drawing Sheets

METHOD OF MANUFACTURING HOLDING DEVICE OF ROLLER BEARING FOR RECTILINEAR MOTION

This is a divisional of co-pending application Ser. No. 863,691 filed on 5/15/86, now U.S. Pat. No. 4,701,059.

BACKGROUND OF THE INVENTION

1. Field of the Invention

The present invention relates to a holding device of a bearing and, more particularly, to an improvement of a holding device made of a plastic material for ball bearing or roller bearing for a finite rectilinear motion.

2. Description of the Prior Art

Recently, a number of rolling bearings for the finite rectilinear motion are used. In association with decrease in size and weight of the apparatus using bearings, the bearing itself becomes small-sized and light weight as well. To reduce the inertial force and weight and the like of the bearing, there occurs a necessity to use the holding device made of a light and easy-to-work plastic material. However, in this case, there is the problem in that the slide resistance is large.

According to a conventional method of supporting rolling members by the small-sized plastic holding device, there is a slight gap between each rolling member and the holding device in the state in which the holding device is in contact with the track member (This holding state is hereinafter referred to as a track member holding state).

To reduce the excessive slide resistance in the above constitution, the inventor of the present application has performed various kinds of experiments and analyzed the causes of such large slide resistance. Thus, the inventor has found out that the main cause relates to the method of supporting the rolling members of the plastic holding device.

Namely, the flat surfaces at which the track grooves of the table and bed are formed come into contact with almost the whole side surfaces of the holding device, so that the slide resistance therebetween causes the excessive slide resistance of the bearing. In particular, this tendency is remarkable in the case of grease lubrication. Consequently, the bearing using the plastic holding device cannot be used at the locations where a measuring instrument or the like is used in which it is required to minimize the slide resistance.

It is generally desirable to avoid contact between the track member and the holding device of the rolling bearing for the finite rectilinear motion (hereinafter, this ideal state is referred to as a rolling member holding state).

In the rolling member holding state, the rolling member comes into contact with the holding device in the state in which there are gaps among the track member and the upper and lower ends of the holding device (both end portions in the direction normal to the moving direction of the bearing), so that the ball supporting portion of the holding device does not come into contact with the track member. Therefore, as the contact between the holding device and the track member, only the upper and lower ends of the holding device come into contact with the flat surfaces at which the track groove is formed. Thus, the slide friction between the holding device and the track member decreases, resulting in a reduction of the slide resistance of the bearing.

However, to realize the rolling member holding state of the holding device, the outside dimensions of the window of the holding device must be set to be smaller than the inside dimensions thereof and the rolling member must be supported.

According to the conventional ball bearing technology, barrel-shaped pins, are arranged like cores in the injection molding die for the holding device and a plastic material is injected and molded at a high pressure and at a high temperature and thereafter, all of the barrel-shaped pins are pulled out in the same direction. However, in this method, the outside portion of the window locating in the pull-out direction of the pins is forcedly reamed and becomes larger than the outside dimensions of the window on the opposite side, so that there is a drawback such that a predetermined rolling member holding state cannot be derived.

As a method of solving such a drawback, the applicant of this application has already proposed the holding device having an I-shaped cross section such as to avoid the contact between the holding device and the track member as shown in FIG. 1 (Japanese Utility Model Application No. 141570/1984). Namely, FIG. 1 is a perspective view with a part cut away showing the conventional example. A holding device 4' is formed so as to have the I-shaped cross section, thereby reducing the slide resistance as small as possible. However, there is a drawback such that the shape of the molding die becomes complicated and the working cost is raised.

SUMMARY OF THE INVENTION

It is an object of the present invention to cheaply provide a plastic holding device which can reduce the slide resistance of a relatively small-sized rolling bearing for rectilinear motion and stably support the rolling members.

To accomplish this object, the present invention intends to prevent the holding device from coming into contact with the track member as much as possible.

The holding device of rolling bearing for the rectilinear motion according to the invention intends to accurately realize the rolling member holding state of the holding device and reduce the slide friction between the holding device and the track member, thereby decreasing the slide resistance of the bearing.

To accomplish the above objects, according to the invention, the holding device of the rolling bearing for the finite rectilinear motion in which balls or rollers are rectilinearly arranged in the track grooves or track surfaces at almost regular intervals has the following features:

(1) The holding device is made of a plastic material and has a rectangular cross section and further has a number of windows to separately arrange the rolling members at predetermined regular intervals.

(2) In the state in which the flat surface or track surface having one track groove is in contact with either one of the upper and lower ends of the side surface of the holding device, the holding device is formed in a manner such that the rolling members come into contact with the holding device and the track member doesn't come into contact with almost the whole surface of the holding device.

(3) The inside dimensions of the windows of the holding device are slightly larger than the diameter of the rolling members. Both outside dimensions of the windows of the holding device are slightly smaller than the diameter of the rolling members.

(4) One of two outside dimensions of the window is smaller than the other one.

(5) The outside dimensions of a plurality of adjacent windows in the same side surface of the holding device differ.

The holding device of the invention is manufactured by a method comprising the following steps.

(1) For the molding die of the holding device having a rectangular cross section and plate-like space portions, a window pin to form a window for a rolling member is arranged like a core at a predetermined position in each of the space portions.

(2) A plastic material is injected and molded into the space portions at a high pressure and at a high temperature.

(3) Adjacent window pins are then alternately pulled out one or two at a time in opposite direction.

By use of the holding device having the constitution mentioned above, an outside diameter L of a window on the side where the window pin is pulled out is larger than an outside diameter S of an adjacent window on the opposite side. Therefore, a desired holding device can be molded by alternately pulling out the window pins of adjacent windows one by one, or a plurality of pins at a time, in the opposite directions.

The above and other objects and features of the present invention will become apparent from the following detailed description and the appended claims with reference to the accompanying drawings.

DESCRIPTION OF THE PREFERRED EMBODIMENTS

An embodiment of the present invention will be described in detail hereinbelow with reference to the drawings.

Figure 2:
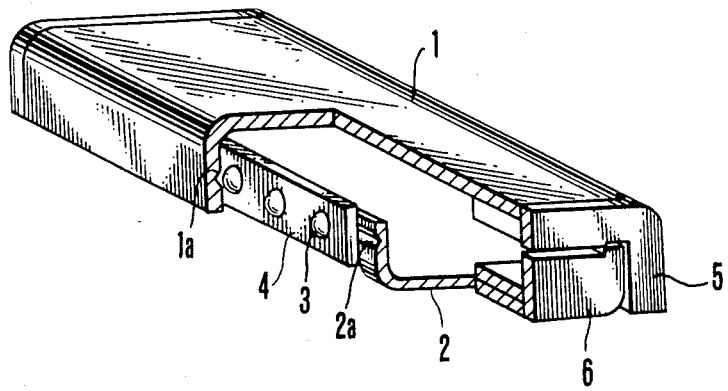
FIG. 2 is a perspective view with a part cut away showing the first embodiment of the present invention.

FIG. 2 is a perspective view with a part cut away showing the first embodiment of the present invention. A table 1 and a bed 2 are formed so as to have an almost U-shaped cross section, respectively. The table 1 overlaps the outside of the bed 2 in a manner such that their inner bottom surfaces in the bending directions face each other. Track grooves 1a and 2a are formed in the longitudinal directions of the overlapping side wall portions of the table 1 and bed 2. In this manner, the bearing is formed. A plurality of balls 3 adapted to engage the track grooves 1a and 2a are supported by a holding device 4 having a rectangular cross section according to the present invention. Namely, the balls 3 are held in a plurality of windows formed in the holding device 4. Upper side plates 5 are fixed to both ends of the table 1 and lower side plates 6 are fixed to both ends of the bed 2 so that the upper and lower side plates don't collide with each other. When the rectilinear motion is performed, the holding devices 4 on both sides come into contact with the upper side plates 5 and lower side plates 6, thereby providing the limit to the rectilinear motion.

Figure 3:
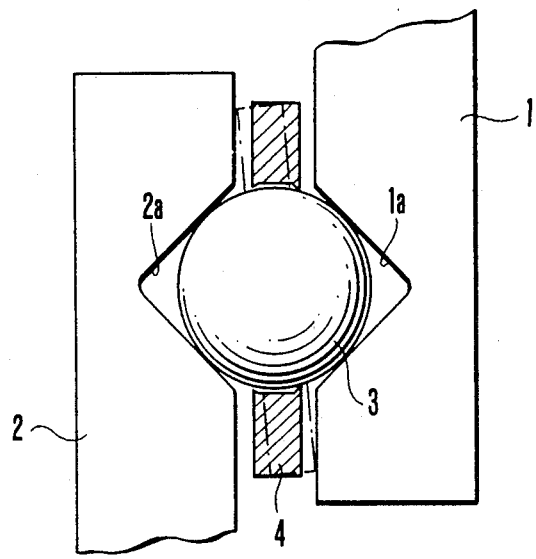
FIGS. 3 and 4 are enlarged cross sectional views for explaining the main part of the first embodiment of FIG. 2.

FIG. 3 is an enlarged cross sectional view showing the portion of the ball 3 in FIG. 2. Projections are formed at right and left edges of each window of the holding device 4 to hold the ball 3, thereby preventing the ball from dropping out of the window. Further, the rolling member holding state is realized by this constitution. Consequently, as can be seen from FIG. 3, in operation of the bearing, only either the upper or the lower edge of the holding device comes into contact with the flat surfaces of the track grooves as indicated by alternate long and short dash lines and the other portions are held in the non-contacting state.

Figure 4:
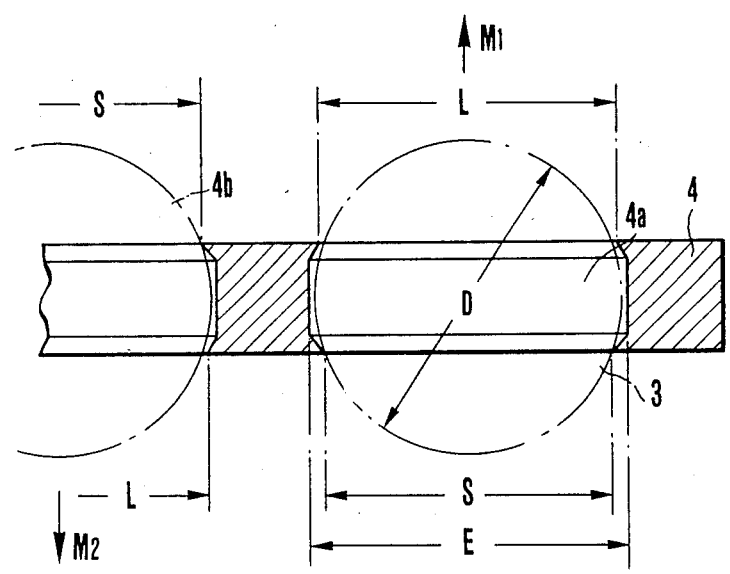

FIG. 4 is a cross sectional view of the holding device of FIG. 3 when it is seen from the top. The dimensions of L and S (namely, diameters of outside peripheral portions of the window) representative of the distances between the respective peripheral projections formed on the right and left sides in the longitudinal directions of each window 4a of the holding device 4 are determined so as to satisfy the relation of $S<L<D<E$ (where, D denotes a diameter of ball 3 and E represents an inside diameter of the window) in consideration of the following point. Namely, when the bearing is manufactured, it is necessary to pull out the barrel-shaped pin for injection molding in the direction from the side of S to the side of L as indicated by an arrow $M_1$. In the adjacent window 4b, the peripheral projections are formed such that the dimensions L and S are opposite to those of the window 4a. Namely, in FIG. 4, the distance S of the window 4b is on the same side as the distance L of the adjacent window 4a and is smaller than the distance of L on the opposite side of the window 4b, so that the barrel-shaped pin can be pulled out in the direction of an arrow $M_2$ opposite to the direction of the arrow $M_1$ in the case of the window 4a. In a manner similar to the above, a plurality of windows are formed in the holding device 4 such that two different kinds of dimensions L and S are alternately obtained. With this constitution, adjacent barrel-shaped pins can be alternately pulled out in opposite directions. By properly setting the values of L and S, the accurate rolling member holding state can be realized.

Figure 5:
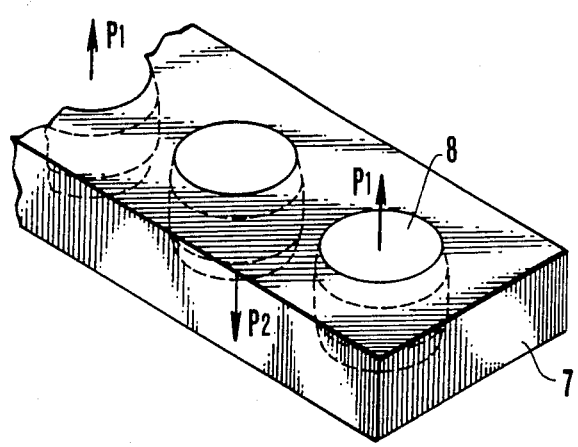
FIG. 5 is a perspective view for explaining a method of manufacturing the holding device in the first embodiment.

FIG. 5 is a perspective view of a molding die to manufacture the holding device according to the invention. First, window pin 8 is formed so as to have a barrel-like shape both peripheral edge portions of which are chamfered. A plurality of such window pins 8 are arranged in a molding die 7 to mold the holding device at predetermined positions, then a plastic material is injected and molded. Thereafter, the pins 8, adjacent one another, are alternately pulled out in the opposite directions in the axial directions as indicated by arrows $P_1$ and $P_2$. Thus, the dimension of S of the window is accurately formed for each pin 8 in the direction opposite to the pull-out direction of the pin. Contrarily, the dimension of L is similarly formed in the pull-out direction of the pin. In this manner, the small and large dimensions are alternately formed in the molding die 7.

On the other hand, in the case where a number of rolling members are built in the holding device, the window pins may be pulled out, for example, two at a time in the opposite directions as well.

Figure 6:
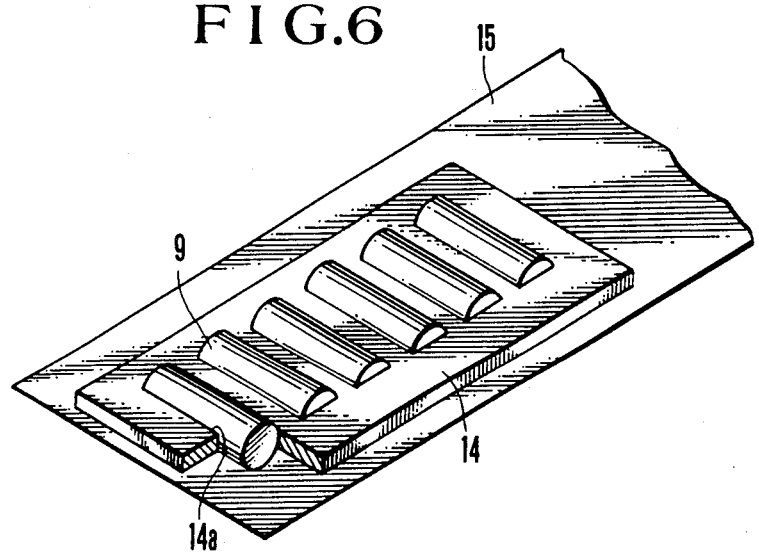
FIG. 6 is a perspective view with a part cut away showing the second embodiment of the invention.

FIG. 6 is a perspective view showing the second embodiment of the invention. This embodiment relates to a slide roller bearing in which rollers 9 are supported at substantially regular intervals by a rectangular plate-like holding device 14. The cross sectional shapes of the windows to insert the rollers 9 are as shown and described in FIG. 4. In FIG. 6, reference numeral 14a denotes a window formed in the holding device 14, and 15 represents a track surface of the track groove.

Figure 7:
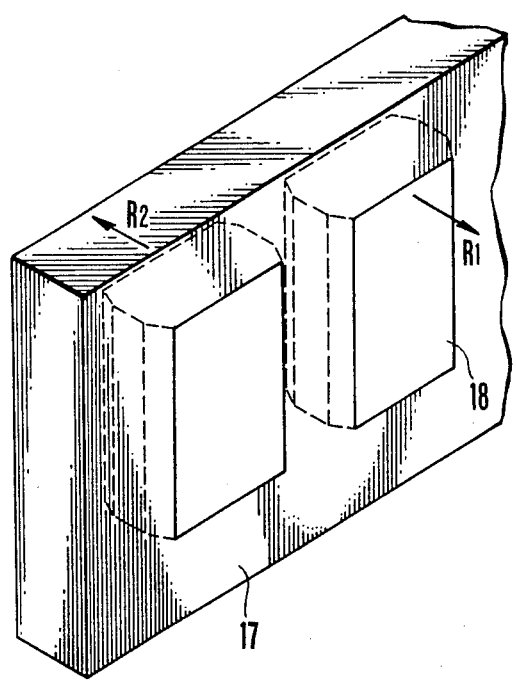
FIG. 7 is a perspective view for explaining a method of manufacturing the holding device in the second embodiment of FIG. 6.

FIG. 7 is a perspective view showing a molding die 17 to mold the holding device of the invention and window pins 18 as cores. With this molding die and pins, the bearing shown in FIG. 6 is formed. In a manner similar to the first embodiment of FIG. 5, a plastic material is injected and molded and thereafter adjacent window pins 18 are alternately pulled out in opposite directions as indicated by arrows $R_1$ and $R_2$. Thus, the holding device of the invention can be formed.

In the above first and second embodiments, adjacent window pins are alternately pulled out one by one in the opposite directions. However, adjacent window pins may be pulled out alternately in opposite directions a plurality of pins at a time. The invention is not necessarily limited to a constant number of pins but can be also applied to other holding devices in which an arbitrary number of adjacent window pins were alternately pulled out at random in the opposite directions to form the windows. In such cases, the effects similar to the foregoing embodiments can be also obtained.

As described above, the holding device and the method of manufacturing the holding device according to the present invention have the following excellent effects and advantages as compared with the conventional technology.

(1) By merely changing the pull-out direction of adjacent window pins upon injection molding, the holding device having a predetermined rolling member holding state can be formed. The cross sectional shape of the holding device is also simple.

Therefore, the cheap and high-accurate holding device can be provided and manufactured.

Figure 1:
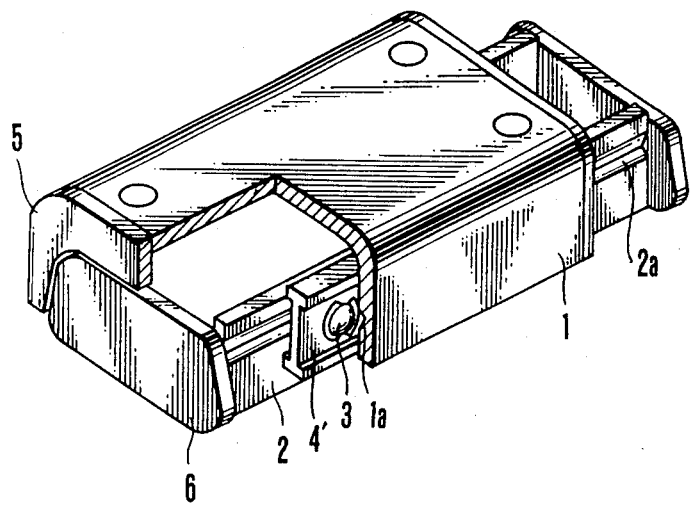
FIG. 1 is a perspective view with a part cut away showing a conventional example.

(2) There is no need to form the holding device with a special cross sectional shape as in the conventional technology of FIG. 1. It is possible to form the bearing of a simple structure in which the slide friction and slide resistance between the holding device and the track member are small.

(3) The holding device can be cheaply and easily manufactured.

Although the present invention has been shown and described with respect to preferred embodiments, various changes and modifications which are obvious to a person skilled in the art to which the invention pertains are deemed to lie within the spirit and scope of the appended claims.

What is claimed is:

1. A method of manufacturing a holding device of a rolling bearing for rectilinear motion in which a plurality of rolling members are rectilinearly arranged at predetermined regular intervals in track grooves or track surfaces, said method comprising the steps of:

preparing a molding die having a cavity with a substantially rectangular cross section;

disposing a plurality of window pins as cores into said cavity at predetermined positions at substantially regular intervals in the longitudinal direction of said molding die;

injecting and molding a plastic material into said cavity of the molding die at a high pressure and at a high temperature; and thereafter, alternately pulling out said window pins one by one in their axial directions adjacent pins pulled in the opposite directions.

2. A method of manufacturing the holding device according to claim 1, wherein each of said window pins has a barrel-type shape.

3. A method of manufacturing the holding device according to claim 1, wherein in the step of pulling out said window pins, a plurality of said window pins are pulled out at the same time, those pins being disposed adjacent to one another pulled out in opposite directions.

* * * * *